United States Patent
Yao

(10) Patent No.: US 12,088,509 B2
(45) Date of Patent: Sep. 10, 2024

(54) DEFAULT GATEWAY MANAGEMENT METHOD, GATEWAY MANAGER, SERVER, AND STORAGE MEDIUM

(71) Applicant: ZTE CORPORATION, Shenzhen (CN)

(72) Inventor: Junli Yao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 18/009,257

(22) PCT Filed: Mar. 22, 2021

(86) PCT No.: PCT/CN2021/082149
§ 371 (c)(1),
(2) Date: Dec. 8, 2022

(87) PCT Pub. No.: WO2021/248972
PCT Pub. Date: Dec. 16, 2021

(65) Prior Publication Data
US 2023/0283571 A1    Sep. 7, 2023

(30) Foreign Application Priority Data
Jun. 9, 2020 (CN) .......................... 202010526414.3

(51) Int. Cl.
*H04L 47/80* (2022.01)
*H04L 12/66* (2006.01)
(Continued)

(52) U.S. Cl.
CPC ............ *H04L 47/803* (2013.01); *H04L 12/66* (2013.01); *H04L 41/0668* (2013.01); *H04L 43/0817* (2013.01)

(58) Field of Classification Search
CPC . H04L 67/1023; G06F 9/5027; G06F 9/5077; G06F 9/44505; G06F 9/5005
See application file for complete search history.

(56) References Cited

U.S. PATENT DOCUMENTS 11,373,119 B1 * 6/2022 Doshi ................... H04L 47/70
2013/0286833 A1 10/2013 Torres et al.
(Continued)

FOREIGN PATENT DOCUMENTS

CN        104951360 A    9/2015
CN        107426274 A    12/2017
(Continued)

OTHER PUBLICATIONS

International Search Report in Application No. PCT/CN2021/082149 dated Jun. 17, 2021, 4 pages, including translation.
(Continued)

*Primary Examiner* — Mahran Y Abu Roumi
(74) *Attorney, Agent, or Firm* — Morgan, Lewis & Bockius LLP

(57) ABSTRACT

Provided is a default gateway management method. The method includes that: a target attribute label of a target application container is detected in response to a default gateway application request; and in a case where the target attribute label exists and a target default gateway pool configured with the target attribute label exists in a gateway resource pool, a default gateway is allocated for the target application container from the target default gateway pool. Further provided are a gateway manager, a server, and a storage medium.

20 Claims, 4 Drawing Sheets

(51) Int. Cl.
    *H04L 41/0668*     (2022.01)
    *H04L 43/0817*     (2022.01)

(56) References Cited

U.S. PATENT DOCUMENTS

| | | | |
|---|---|---|---|
| 2015/0006609 A1* | 1/2015 | Sampath | G06F 9/5072 |
| | | | 709/202 |
| 2016/0261684 A1* | 9/2016 | Khalaf | H04L 67/01 |
| 2017/0052807 A1 | 2/2017 | Kristiansson et al. | |
| 2017/0359271 A1* | 12/2017 | Koh | H04L 47/70 |
| 2019/0102206 A1* | 4/2019 | Fichtenholtz | G06F 9/5027 |
| 2019/0286820 A1* | 9/2019 | Yoon | G06F 21/566 |
| 2019/0340376 A1* | 11/2019 | Fleck | H04L 67/5683 |

FOREIGN PATENT DOCUMENTS

| | | | | |
|---|---|---|---|---|
| CN | 111064781 A | 4/2020 | | |
| JP | 2007181239 A | 7/2007 | | |
| WO | WO2012/001221 A1 | 1/2012 | | |
| WO | WO-2021115350 A1 * | 6/2021 | ......... | H04L 67/1023 |

OTHER PUBLICATIONS

Office Action in Japanese Application No. 2022-576081 dated Nov. 7, 2023, 6 pages, including translation.
Extended European Search Report of Application No. 21822056.4 dated May 14, 2024, 10 pages.

\* cited by examiner

DEFAULT GATEWAY MANAGEMENT METHOD, GATEWAY MANAGER, SERVER, AND STORAGE MEDIUM

CROSS REFERENCE TO RELATED APPLICATIONS

This is a National Stage Application filed under 35 U.S.C. 371, based on International Patent Application No. PCT/CN2021/082149, filed on Mar. 22, 2021, which claims priority to Chinese Patent Application No. 202010526414.3 filed with the China National Intellectual Property Administration (CNIPA) on Jun. 9, 2020, the disclosures of which are incorporated herein by reference in their entireties.

TECHNICAL FIELD

The present application relates to the technical field of communications, and for example, a default gateway management method, a gateway manager, a server, and a storage medium.

BACKGROUND

The application service implementation based on containers has various advantages of simplified deployment, multi-environment support, fast start, service orchestration, ease of migration, flexible scaling, and the like, so that a container running the application service is more lightweight than a virtual machine. Since a container orchestration management engine may dynamically adjust the running position or the running quantity of containers according to an actual running state, a change of containers may trigger the application and release of a network resource of the containers. To reduce an influence of the change of an internal network of the container cloud on the external, the containers are generally isolated from an external network based on communication of the internal network. When a service within the containers needs access to a service on the external network, the access requires to be made through a default gateway. In the related art, the default gateway of the containers is usually configured as a common default gateway of a cloud environment where the containers are located, that is, multiple containers share one common default gateway, which causes that an out-of-cloud service cannot identify the identity of a service contained in a container according to the Internet protocol (IP) of the common default gateway when the container accesses the out-of-cloud service, thus a firewall cannot be set according to rules. Meanwhile, resource waste is also caused since other default gateways in the cloud environment are unused.

SUMMARY

The present application provides a default gateway management method, a gateway manager, a server, and a storage medium.

A default gateway management method is provided. The method includes that: a target attribute label of a target application container is detected in response to a default gateway application request; and in a case where the target attribute label exists and a target default gateway pool configured with the target attribute label exists in a gateway resource pool, a default gateway is allocated for the target application container from the target default gateway pool.

A gateway manager is further provided. The gateway manager includes a detection module and an allocation module. The detection module is configured to detect a target attribute label of a target application container in response to a default gateway application request. The allocation module is configured to allocate a default gateway for the target application container from a target default gateway pool in a case where the detection module detects that the target attribute label exists and the target default gateway pool configured with the target attribute label exists in a gateway resource pool.

A server is further provided. The server includes one or more processors and a storage apparatus. The storage apparatus stores one or more programs, where when the one or more programs are executed by the one or more processors, the one or more processors are caused to implement the default gateway management method described above.

A storage medium is further provided. The storage medium is configured as a computer-readable storage, where the storage medium stores one or more programs, and the one or more programs are executable by one or more processors to implement the default gateway management method described above.

DETAILED DESCRIPTION

A default gateway management method, a gateway manager, a server, and a storage medium provided in the present application are described below with reference to the accompanying drawings.

Example embodiments will be described hereinafter with reference to the drawings, but the example embodiments may be embodied in different forms and should not be construed as limited to the embodiments set forth herein.

The terms used herein are for the purpose of describing particular embodiments only and are not intended to be limitations of the present disclosure. As used herein, the singular form "a/an" and "the" are intended to include the plural form as well, unless the context indicates otherwise. The terms "includes" and/or "made of" when used herein, specify the presence of stated features, integers, processes, operations, elements, and/or assemblies, but do not preclude the presence or addition of one or more other features, integers, processes, operations, elements, assemblies, and/or groups thereof.

Although terms such as first and second may be used herein to describe various elements/instructions/requests, these elements/instructions/requests should not be limited by these terms. These terms are only used to distinguish one element/instruction/request from another element/instruction/request.

Unless otherwise defined, all the terms (including technical and scientific terms) used herein have the same meanings as those commonly understood. Terms, such as those defined in commonly used dictionaries, should be interpreted as having meanings consistent with their meanings in the context of the related art and/or the present disclosure and are not to be interpreted in an idealized or overly formal sense unless expressly so defined herein.

Figure 1:
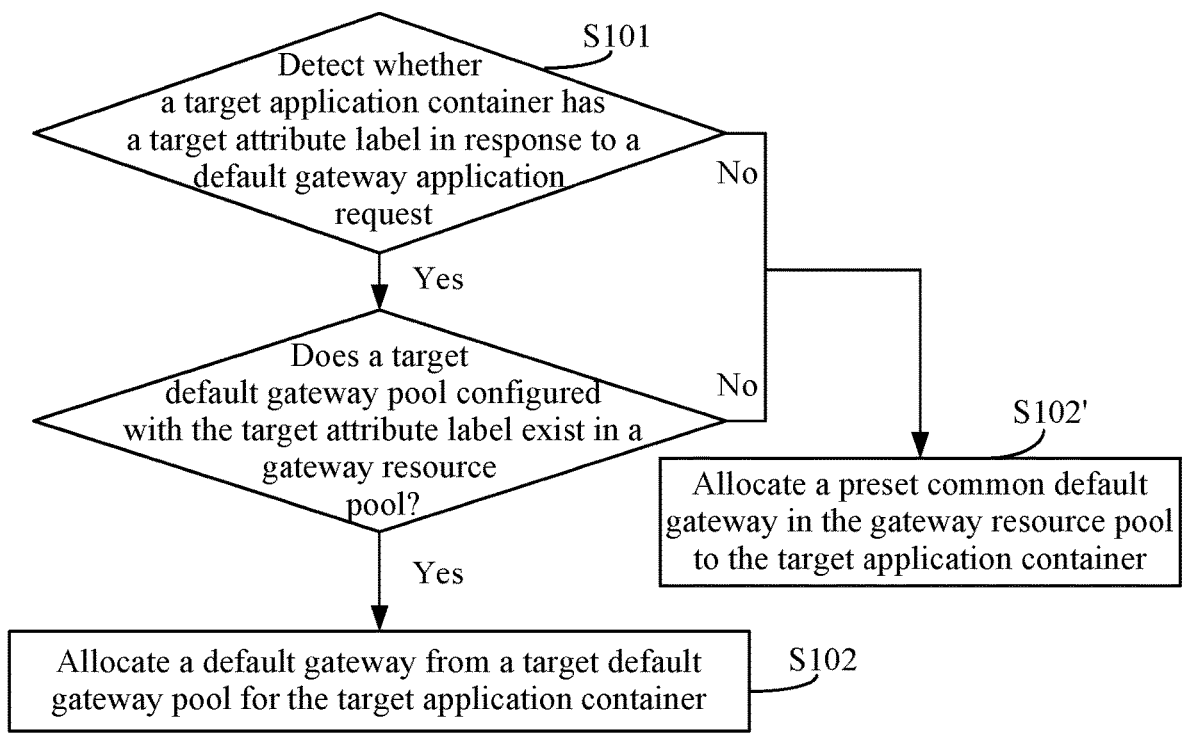
FIG. 1 is a flowchart of a default gateway management method provided in an embodiment of the present application.

FIG. 1 is a flowchart of a default gateway management method provided in an embodiment of the present application, the method uses a gateway manager as an execution subject, and the gateway manager is deployed on a cloud platform and configured to allocate a default gateway for a container deployed on the cloud platform.

As shown in FIG. 1, the method includes the following:

In S101, in response to a default gateway application request, a target attribute label of a target application container is detected.

In the present application, when the target application container is initiated, the target application container sends the default gateway application request to a container gateway configurator, and after the container gateway configurator receives the default gateway application request, the container gateway configurator sends the default gateway application request to the gateway manager. In this manner, an allocation of the default gateway to the target application container is implemented by the gateway manager. In some embodiments, the default gateway application request may also be sent by the target application container directly to the gateway manager, at this time, the container gateway configurator is actually configured as one function module of the application container.

The gateway manager detects the target attribute label of the target application container after receiving the default gateway application request. In the present application, when each application container is deployed on the cloud platform, information about the application container is sent to the cloud platform for storage, the information includes an identifier of the application container and an attribute label related to the application container, the attribute label related to the application container may include an attribute label of the container itself, an attribute label of a user to which the container belongs, and an attribute label of a set to which the container belongs, and the like. Not all of the above attribute labels of each application container exist, and each attribute label of the application container is configured by a user according to actual needs during deployment.

In S102, if the target attribute label exists and a target default gateway pool configured with the target attribute label exists in a gateway resource pool, a default gateway from the target default gateway pool is allocated for the target application container.

The gateway resource pool is a resource pool preset in the gateway manager, multiple default gateway pools are configured in the gateway resource pool, at least one gateway is disposed in each default gateway pool, and the at least one gateway is configured to be allocated for use by the application container. Each default gateway pool may be configured with an attribute label, the attribute label configured for the default gateway pool corresponds to the attribute label of the application container, and the attribute label of the application container herein is referred to as the attribute label configured for the application container itself, or the attribute label configured for a user to which the application container belongs, or the attribute label configured for a set to which the application container belongs.

In S102, after detecting the attribute label of the target application container, the gateway manager detects whether a default gateway pool configured with the target attribute label of the target application container exists in the gateway resource pool, the default gateway pool is used as the target default gateway pool, and a default gateway from the target default gateway pool is allocated for the target application container after detecting the existence of the target default gateway pool.

The selection of the default gateway from the target default gateway pool may be implemented based on a preset allocation policy, the allocation policy may be preset within the gateway manager according to actual needs. If the target default gateway pool is configured with the allocation policy, an available gateway is selected from the target default gateway pool to allocate to the target application container according to the configured allocation policy; and if the target default gateway pool is not configured with the allocation policy, an available gateway is randomly selected from the target default gateway pool to allocate to the target application container.

As an implementation form of the allocation policy, S102 may include selecting, based on a polling policy, the available gateway from the target default gateway pool to allocate to the target application container. For example, an available gateway is selected according to a polling pointer from an available gateway list of the target default gateway pool to allocate to the target application container.

As another implementation form of the allocation policy, S102 may include selecting, from the target default gateway pool, an available gateway with the minimum number of allocated times to allocate to the target application container. For example, each gateway in the target default gateway pool is recorded with the number of allocated times, the available gateway having the minimum number of allocated times is selected from an available gateway list to allocate to the target application container, and meanwhile, the number of allocated times of the selected available gateway is incremented by one.

As still another implementation form of the allocation policy, S102 may include determining, from the target default gateway pool, an available gateway having the maximum available bandwidth, and if an available bandwidth of the available gateway having the maximum available bandwidth is greater than the required bandwidth of the target application container, allocating the available gateway having the maximum available bandwidth for the target application container. For example, each gateway in the default gateway pool is provided with available bandwidth information of the gateway at registration, such as 1 G, 10 G, 100 G, etc., when applying for the default gateway, the application container carries information about a required bandwidth required for accessing an external network, such as 100 M, 1000 M, etc., the available gateway having the maximum available bandwidth is determined from the available gateway list of the target default gateway pool, and the available bandwidth of the available gateway having the maximum available bandwidth is compared to the required bandwidth of the target application container, and if the available bandwidth of the available gateway having the maximum available bandwidth is greater than the required bandwidth of the target application container, the available gateway having the maximum available bandwidth is allocated to the target application container.

Forms of the three allocation policies described above are exemplary only and do not pose limitations on the technical schemes of the present application; in the embodiments of the present application, other allocation policies may also be utilized in S102, which are no longer exemplified here.

According to the default gateway management method provided in the embodiment of the present application, when the application container is started, the application container sends the default gateway application request, after the gateway manager receives the default gateway application request, the gateway manager selects, according to the attribute label of the application container, one gateway from a preset default gateway pool corresponding to the attribute label of the application container as the default gateway of the application container. Compared to the related art, the default gateway allocated for each application container by the default gateway management method provided in the present application is a dedicated default gateway corresponding to the application container, thus when the application container accesses an off-cloud service, the off-cloud service is able to recognize an identity of a service within the application container through a source IP corresponding to the default gateway of the application container, thereby facilitating the setting of firewall rules by the off-cloud service. Meanwhile, due to a separation of external access outlets of different application containers, the data traffic load balancing is achieved, and the utilization rate of gateway resources on the cloud platform is improved.

Referring to FIG. 1, in some embodiments, the target application container may not be configured with the target attribute label (including the attribute label for itself, the attribute label for a user to which the target application container belongs, and the attribute label for a set to which the target application container belongs), alternatively, the target attribute label for the target application container exists, but the target default gateway pool configured with this target attribute label does not exist in the gateway resource pool, at this time, a preset common default gateway in the gateway resource pool may be directly allocated to this target application container, as in S102' of FIG. 1.

Figure 2:
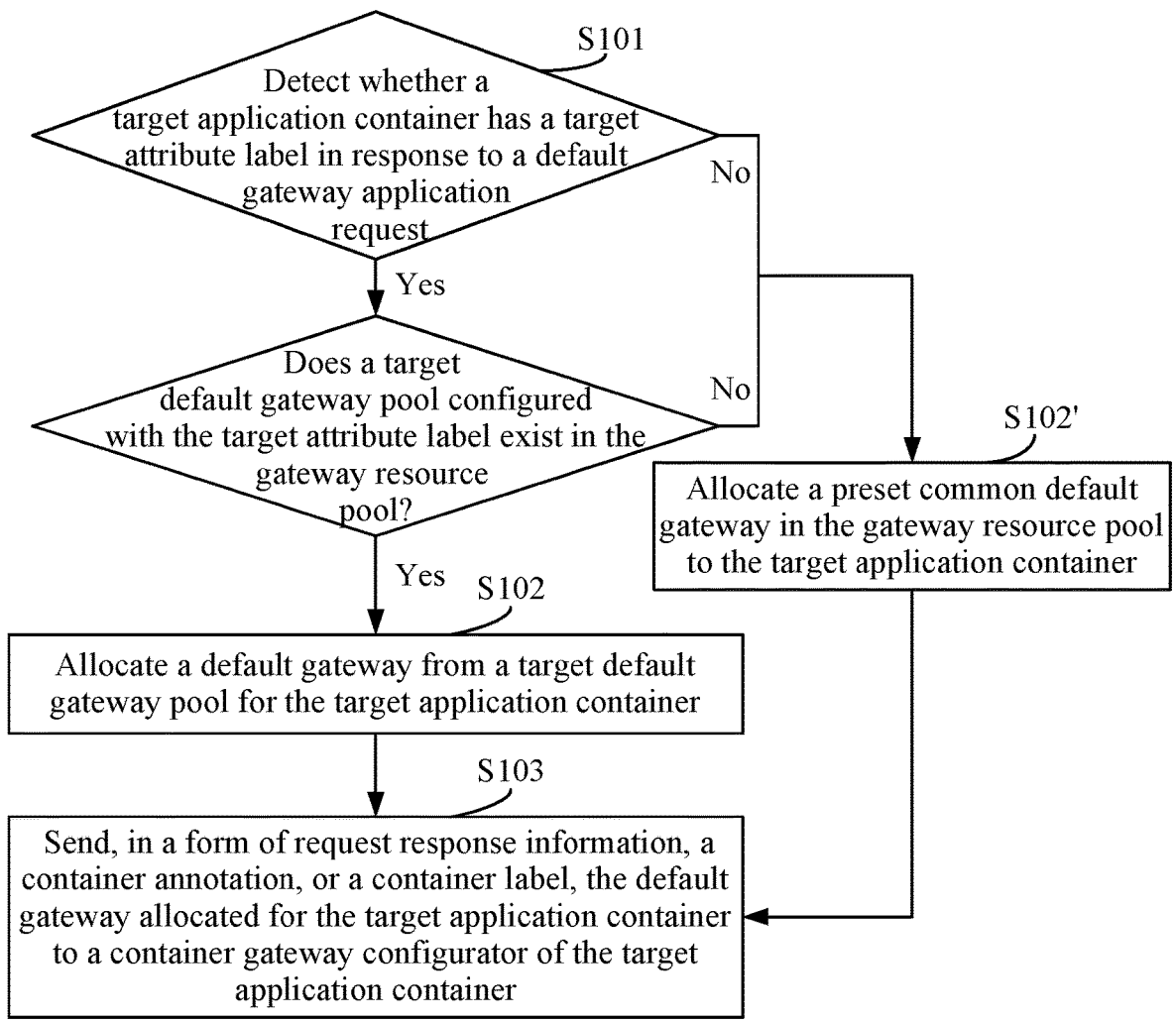
FIG. 2 is a flowchart of another default gateway management method provided in an embodiment of the present application.

FIG. 2 is a flowchart of another default gateway management method provided in the present application, as shown in FIG. 2, on the basis of the embodiment described in FIG. 1, after S102 and S102', the default gateway management method provided in this embodiment further includes the following:

In S103, the default gateway allocated for the target application container is sent in a form of request response information, a container annotation, or a container label to a container gateway configurator of the target application container.

After the gateway manager determines the target default gateway of the target application container, the gateway manager sends the target default gateway to the container gateway configurator of the target application container, so that the container gateway configurator configures the target default gateway as the default gateway of the target application container. In this embodiment, the gateway manager sends the default gateway allocated for the target application container in the form of the request response information, container annotation, or container label to the container gateway configurator of the target application container, and in actual applications, the default gateway may be sent in other forms as well.

Figure 3:
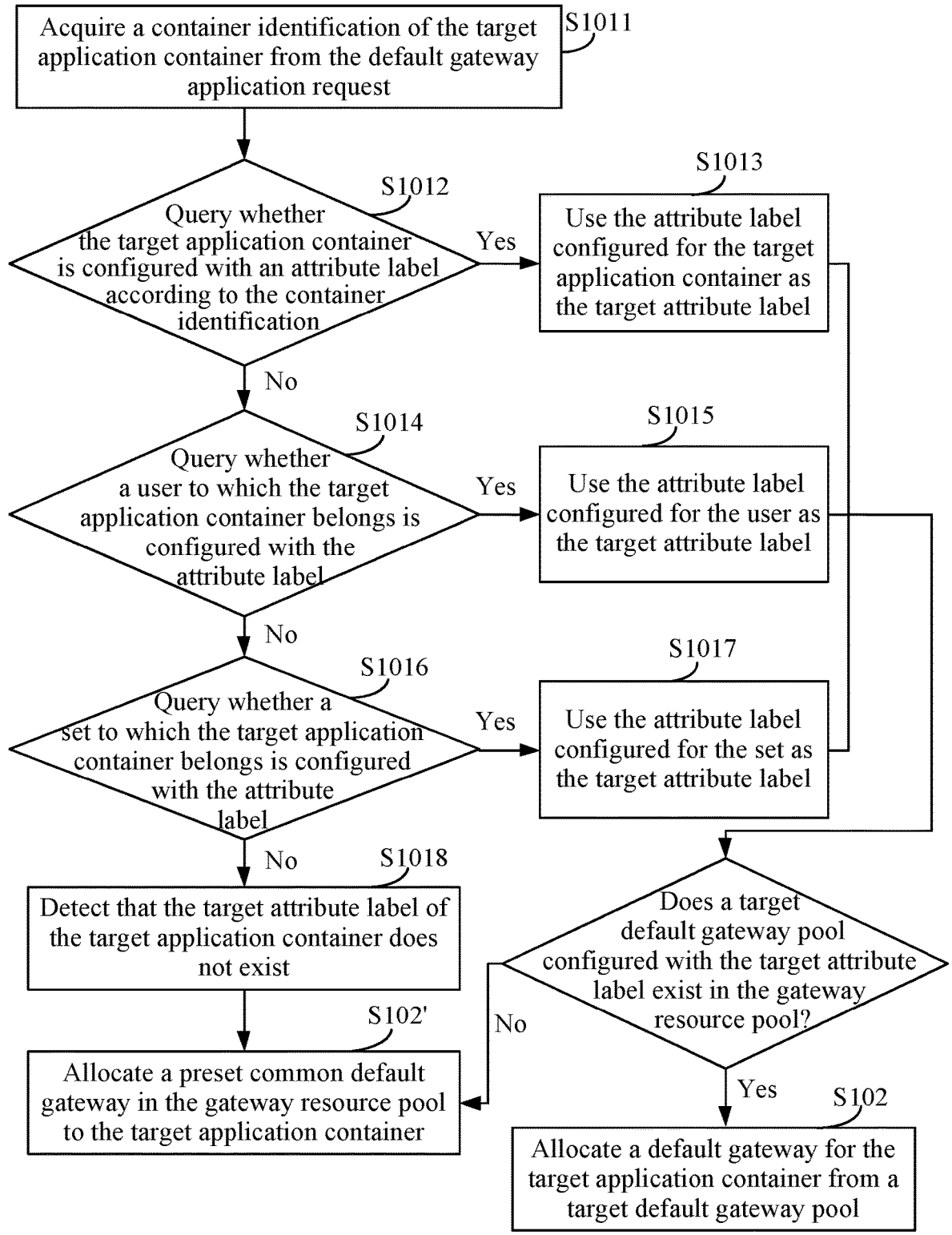
FIG. 3 is a flowchart of still another default gateway management method provided in an embodiment of the present application.

FIG. 3 is a flowchart of still another default gateway management method provided in an embodiment of the present application, and as shown in FIG. 3, the default gateway management method provided in this embodiment is based on the embodiment shown in FIG. 1, S101 includes described below.

In S1011, a container identification of the target application container is acquired from the default gateway application request.

In S1012, it is queried whether the target application container is configured with an attribute label according to the container identification.

If it is queried that the target application container is configured with the attribute label, S1013 is executed, or if it is queried that the target application container is not configured with the attribute label, S1014 is executed.

In S1013, the attribute label configured for the target application container is used as the target attribute label.

In S1014, it is queried whether a user to which the target application container belongs is configured with the attribute label.

If it is queried that the user is configured with the attribute label, S1015 is executed; or if it is queried that the user is not configured with the attribute label, S1016 is executed.

In S1015, the attribute label configured for the user to which the target application container belongs is used as the target attribute label.

In S1016, it is queried whether a set to which the target application container belongs is configured with the attribute label.

If it is queried that the set is configured with the attribute label, S1017 is executed; or if it is queried that the set is not configured with the attribute label, S1018 is executed.

In S1017, the attribute label configured for the set to which the target application container belongs is used as the target attribute label.

In S1018, it is detected that the target attribute label of the target application container does not exist.

In this embodiment, when the attribute label of the target application container is detected, it is first detected whether the attribute label configured for the target application container itself exists, when it is detected that the attribute label configured for the target application container itself does not exist, then it is detected sequentially whether the attribute label configured for a user to which the target application container belongs exists and whether the attribute label configured for a set to which the target application container belongs exists, so that an attribute label representing characteristics of the target application container may be finally determined.

For example, in the present application, programmatically, different attribute labels represent different source IP groups for accessing external networks. For example, a default gateway pool (GWP)-A for vendor A is created, three IP addresses are added into GWP-A, i.e., IP-A1, IP-A2, and IP-A3, respectively, and an attribute label gwtype=A is added to GWP-A. If the attribute label gwtype=A is added to the account of vendor A, all application containers of vendor A are allocated a default gateway from IP-A1, IP-A2, and IP-A3, and if the attribute label gwtype=A is added to only one application container of vendor A, only the container added with the attribute label is allocated a default gateway from IP-A1, IP-A2, and IP-A3.

Figure 4:
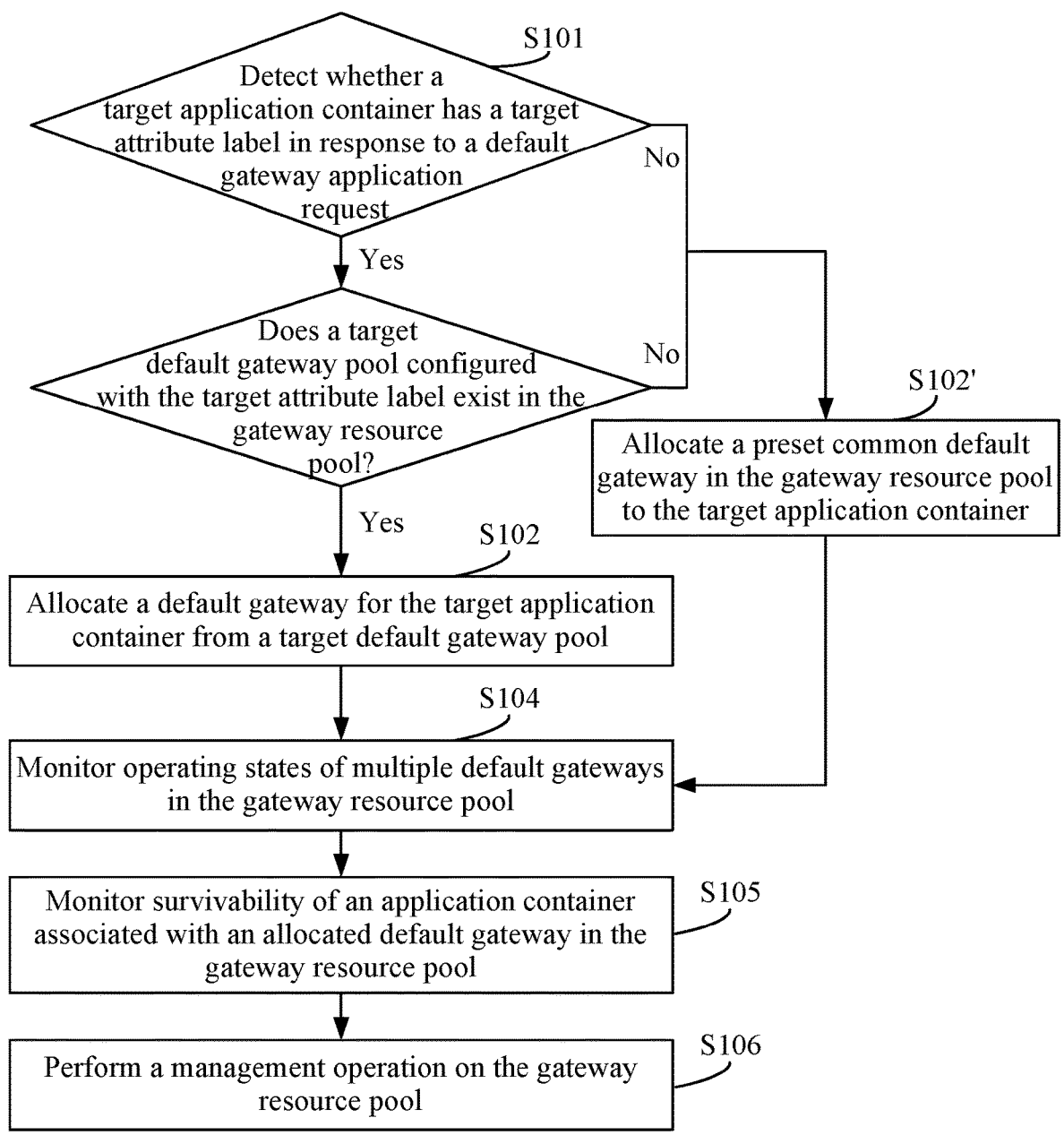
FIG. 4 is a flowchart of yet another default gateway management method provided in an embodiment of the present application.

FIG. 4 is a flowchart of yet another default gateway management method provided in an embodiment of the present application, as shown in FIG. 4, the default gateway management method provided in this embodiment is based on the embodiment shown in FIG. 1, and the method further includes the following:

In S104, operating states of multiple default gateways in the gateway resource pool are monitored.

In this embodiment, the gateway manager monitors the operating states of the multiple default gateways in the gateway resource pool, for example, a detection is performed at preset time intervals, or a detection is performed each time when a default gateway application request is received. When an abnormal operating state of a default gateway is detected, the default gateway having the abnormal operating state is denoted as unavailable, and when the default gateway denoted as unavailable returns to be normal, the default gateway returning to be normal is denoted as available, that is, in this embodiment, the gateway manager updates a respective available gateway list in each default gateway pool according to a detection result, and the available gateway list includes currently available gateways in the default gateway pool. The availability of a default gateway to be allocated is monitored, so that the effectiveness of a gateway subsequently allocated to the application container is improved, and meanwhile, the accessibility of the application container to the external network is also improved.

Referring to FIG. 4, in some embodiments, the method further includes the following:

In S105, survivability of an application container associated with an allocated default gateway in the gateway resource pool is monitored.

In this embodiment, the gateway manager monitors the survivability of the application container associated with the allocated default gateway in the gateway resource pool, for example, a detection is performed at preset time intervals, when it is monitored that an application container associated with a default gateway has been deleted or operates abnormally, the default gateway that is in the gateway resource pool and referenced by the deleted or abnormal-operating application container is released in the default gateway pool to which the default gateway belongs, that is, the reference relation between the deleted or abnormal-operating application container and the default gateway referenced by the application container is dissolved in the default gateway resource pool. In this embodiment, the survivability of the application container associated with the allocated default gateway is monitored, so that an invalid reference relation between the application container and the default gateway may be found and dissolved in time, thereby the resource waste of the default gateway is avoided, and thus the resource utilization rate is improved.

Referring to FIG. 4, in some embodiments, the method further includes the following:

In S106, a management operation is performed on the gateway resource pool.

Multiple default gateway pools are configured in the gateway resource pool, and at least one default gateway is configured in each default gateway pool. In actual applications, the gateway manager may perform the management operation on the resource management pools, so that containers registered on the cloud platform may be allocated to the default gateways efficiently.

The management operation in S106 may include the following:

(1) A default gateway pool is newly added to the gateway resource pool. After the cloud environment deployment of the cloud platform is completed, the gateway manager creates default gateway pools, and the default gateway pools may correspond to users registered on the cloud platform, for example, one default gateway pool corresponds to one user.

(2) A specific default gateway pool in the gateway resource pool is queried. According to the attribute label of the application container, the specific default gateway pool corresponding to the attribute label is queried.

(3) A default gateway pool list of the gateway resource pool is generated.

(4) A default gateway pool in the gateway resource pool is deleted.

(5) A default gateway is deregistered in a default gateway pool.

(6) An attribute label is added for a default gateway pool.

(7) An attribute label of a default gateway pool is deleted.

(8) A default gateway allocation policy is configured for a default gateway pool. For example, the allocation policy is a random policy, a polling policy, and an allocation policy based on the bandwidth or the number of allocated times.

The execution order of S104, S105, and S106 is not limited in the present application, in actual applications, S104, S105, and S106 are monitored and executed in real-time by the gateway manager, and only one execution order of S104, S105, and S106 is shown in FIG. 4, which is not intended to limit the present application.

The default gateway management method provided herein is described below by way of example.

Assuming that network functions virtualization (NFV) application pods of three operators, i.e., operator A, operator B, and operator C, are simultaneously deployed on the container platform Kubernets (often abbreviated as K8s, it is an open-source system configured to automatically deploy, extend and manage "containerized application programs" and is intended to provide "a platform for automatic deploying, extending and running application program containers across clusters of hosts"), each operator owns its unique clusters connected to the current Kubernets clusters through a firewall, and a policy is configured in the firewall to ensure that only a specified set of IP addresses may access unique internal services of clusters corresponding to an operator.

When the application container pod of the operator is registered, a label is added to the application container of each operator, the label of an application container pod of operator A is gwtype=app-a, the label of an application container pod of operator B is gwtype=app-b, and the label of an application container pod of operator C is gwtype=app-c.

The default gateway pool is managed using custom resource definition (CRD) in the Kubernetes clusters. Correspondingly, user resources of DefaultGatewayPool (DGP) type need to be defined through an application programming interface (API) of Kubernetes. Multiple DefaultGatewayPool-type resources are then created through the API of Kubernetes. The addition and deletion of an attribute are achieved by adding a label to the DefaultGatewayPool-type resources.

A DefaultGatewayPool is created, named DGP-A, the namespace is A, gateways GA0, GA1, and GA2 are added to DGP-A, and a label, i.e., AppType=CloudA, is added to DGP-A.

A DefaultGatewayPool is created, named DGP-B, the namespace is B, gateways GB0, GB1, and GB2 are added to DGP-B, and a label, i.e., AppType=CloudB, is added to DGP-B.

A DefaultGatewayPool is created, named DGP-C, the namespace is C, gateways GC0, GC1, and GC2 are added to DGP-C, and a label, i.e., AppType=CloudC, is added to DGP-C.

The common default gateway of Kubernetes cloud is configured to be GW.

When the pod is started, a container network interface (CNI) (the CNI is a project under the cloud native computing foundation (CNCF) and consists of a set of specifications and libraries for configuring network interfaces of Linux containers, some plug-ins are also contained in the CNI, and the CNI only concerns network allocation when a container is created and release of network resources when a container is deleted) plug-in is triggered to enter the execution time, and the container gateway configurator is triggered by the CNI plug-in for applying a default gateway of the pod. The gateway manager detects the label of the pod and selects a default gateway pool corresponding to the label of the pod based on the label of the pod, for example, the label of the pod is gwtype=app-a, then the corresponding default gateway pool is a default gateway pool with the label of AppType=CloudA, that is, the gateway pool DGP-A, and a default gateway is selected from DGP-A based on the preset allocation rule.

Figure 5:
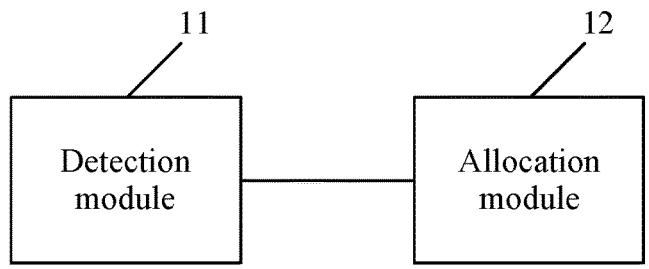
FIG. 5 is a schematic structural diagram of a gateway manager provided in an embodiment of the present application.

The present application further provides a gateway manager, FIG. 5 is a schematic structural diagram of a gateway manager provided in the present application, the gateway manager is configured to implement the default gateway management method shown in FIG. 1 in the present application, and as shown in FIG. 5, the gateway manager includes a detection module 11 and an allocation module 12.

The detection module 11 is configured to detect a target attribute label of a target application container in response to a default gateway application request. The allocation module 12 is configured to allocate a default gateway for the target application container from a target default gateway pool in a case where the detection module 11 detects that the target attribute label exists and the target default gateway pool configured with the target attribute label exists in a gateway resource pool.

The present application further provides a server, the server includes one or more processors and a storage apparatus, the storage apparatus stores one or more programs, and when the one or more programs are executed by the one or more processors, the one or more processors are caused to implement the default gateway management method provided in the present application.

The present application further provides a storage medium, the storage medium is configured as a computer-readable storage, the storage medium stores one or more programs, and the one or more programs are executable by one or more processors to implement the default gateway management method provided in the present application.

All or some of the processes of the methods, systems, function modules/units in the apparatuses disclosed above may be implemented as software, firmware, hardware, and suitable combinations thereof. In a hardware implementation, a division between function modules/units mentioned in the above description does not necessarily correspond to the division of physical assemblies; for example, one physical assembly may have multiple functions, or one function or process may be performed by multiple physical assemblies in cooperation. Some or all of the physical assemblies may be implemented as software executed by a processor, such as a central processing unit, a digital signal processor or a microprocessor, or may be implemented as hardware, or may be implemented as an integrated circuit, such as an application specific integrated circuit. Such software may be distributed on a computer-readable medium, and the computer-readable medium may include a computer storage medium (or a non-transitory medium) and a communication medium (or a transitory medium). The term "computer storage medium" includes a volatile and nonvolatile, removable and non-removable medium implemented in any method or technology for storage of information (such as, a computer-readable instruction, a data structure, a program module or other data). The computer storage medium includes, but is not limited to, a random access memory (RAM), a read-only memory (ROM), an electrically erasable programmable read-only memory (EEPROM), a flash memory or other memory technologies, a compact disc read-only memory (CD-ROM), a digital versatile disc (DVD) or other optical disk storage, magnetic cassettes, magnetic tape, magnetic disk storage or other magnetic storage apparatuses, or any other media which may be configured to store the desired information and which may be accessed by a computer. Further, the communication medium typically embodies the computer-readable instruction, the data structure, the program module, or other data in a modulated data signal such as a carrier wave or other transport mechanisms, and may include any information delivery media.

What is claimed is:

1. A default gateway management method, comprising:
   determining a pre-configured attribute label corresponding to application containers deployed on a cloud platform, wherein the attribute label comprises at least one of the following: an attribute label of an application container, an attribute label of a user to which an application container belongs, or an attribute label of a set to which an application container belongs;
   detecting a target attribute label of a target application container in response to a default gateway application request;
   using a default gateway pool configured with the detected target attribute label in a gateway resource pool as a target default gateway pool; and
   allocating a default gateway for the target application container from the target default gateway pool;
   wherein detecting the target attribute label of the target application container comprises:
   acquiring a container identification of the target application container from the default gateway application request;
   querying whether the target application container is configured with an attribute label according to the container identification; and
   when it is queried that the target application container is configured with the attribute label, using the attribute label pre-configured for the target application container as the target attribute label; or when it is queried that the target application container is not configured with the attribute label, querying whether the user to which the target application container belongs is configured with the attribute label.

2. The method of claim 1, further comprising:
   in a case where no target attribute label is detected or in a case where the target attribute label is detected but no default gateway pool configured with the target attribute label exists in the gateway resource pool, allocating a preset common gateway in the gateway resource pool to the target application container.

3. The method of claim 1, wherein after allocating the default gateway for the target application container from the target default gateway pool, the method further comprises:
   sending the default gateway allocated for the target application container in a form of request response information, a container annotation, or a container label to a container gateway configurator of the target application container.

4. The method of claim 1, wherein allocating the default gateway for the target application container from the target default gateway pool comprises:

in a case where the target default gateway pool is not configured with an allocation policy, randomly selecting an available gateway from the target default gateway pool to allocate to the target application container; or in a case where the target default gateway pool is configured with the allocation policy, selecting, according to the configured allocation policy, an available gateway from the target default gateway pool to allocate to the target application container.

5. The method of claim 4, wherein selecting, according to the configured allocation policy, the available gateway from the target default gateway pool to allocate to the target application container comprises one of:

selecting, based on a polling policy, the available gateway from the target default gateway pool to allocate to the target application container;

selecting, from the target default gateway pool, an available gateway with a minimum number of allocated times to allocate to the target application container; or determining, from the target default gateway pool, an available gateway having a maximum available bandwidth, and in a case where an available bandwidth of the available gateway having the maximum available bandwidth is greater than a required bandwidth of the target application container, allocating the available gateway having the maximum available bandwidth to the target application container.

6. The method of claim 1, further comprising:

monitoring operating states of a plurality of default gateways in the gateway resource pool;

when an abnormal operating state of a default gateway in the plurality of default gateways exists, denoting the default gateway having the abnormal operating state as unavailable; and after the default gateway denoted as unavailable returns to be normal, denoting the default gateway returning to be normal as available.

7. The method of claim 1, further comprising:

monitoring survivability of an application container associated with an allocated default gateway in the gateway resource pool; and in a case where the associated application container is deleted or operates abnormally, releasing the default gateway that is in the gateway resource pool and referenced by the deleted or abnormal-operating application container.

8. The method of claim 1, further comprising:

performing a management operation on the gateway resource pool.

9. The method of claim 8, wherein performing the management operation on the gateway resource pool comprises at least one of:

newly adding, in the gateway resource pool, a default gateway pool;

querying a specific default gateway pool in the gateway resource pool;

generating a default gateway pool list of the gateway resource pool;

deleting a default gateway pool in the gateway resource pool;

deregistering a default gateway in a default gateway pool of the gateway resource pool;

adding an attribute label for a default gateway pool in the gateway resource pool;

deleting an attribute label of a default gateway pool in the gateway resource pool; or configuring a default gateway allocation policy for a default gateway pool in the gateway resource pool.

10. The method of claim 1, wherein querying whether the user to which the target application container belongs is configured with the attribute label comprises:

when it is queried that the user to which the target application container belongs is configured with the attribute label, using the attribute label pre-configured for the user as the target attribute label; or when it is queried that the user to which the target application container belongs is not configured with the attribute label, querying whether the set to which the target application container belongs is configured with the attribute label;

wherein querying whether the set to which the target application container belongs is configured with the attribute label comprises:

when it is queried that the set to which the target application container belongs is configured with the attribute label, using the attribute label pre-configured for the set as the target attribute label; or when it is queried that the set to which the target application container belongs is not configured with the attribute label, detecting that the target attribute label of the target application container does not exist.

11. A server, comprising:

at least one processor; and a storage apparatus, which is configured to store at least one program, wherein the at least one program, when executed by the at least one processor, causes the at least one processor to implement the following:

determining a pre-configured attribute label corresponding to application containers deployed on a cloud platform, wherein the attribute label comprises at least one of the following: an attribute label of an application container, an attribute label of a user to which an application container belongs, or an attribute label of a set to which an application container belongs;

detecting a target attribute label of a target application container in response to a default gateway application request;

using a default gateway pool configured with the detected target attribute label in a gateway resource pool as a target default gateway pool; and allocating a default gateway for the target application container from the target default gateway pool;

wherein detecting the target attribute label of the target application container comprises:

acquiring a container identification of the target application container from the default gateway application request;

querying whether the target application container is configured with an attribute label according to the container identification; and when it is queried that the target application container is configured with the attribute label, using the attribute label pre-configured for the target application container as the target attribute label; or when it is queried that the target application container is not configured with the attribute label, querying whether the user to which the target application container belongs is configured with the attribute label.

12. A non-transitory storage medium, configured as a non-transitory computer-readable storage, wherein the storage medium stores at least one program, and the at least one program is executable by at least one processor to implement the following:

determining a pre-configured attribute label corresponding to application containers deployed on a cloud platform, wherein the attribute label comprises at least one of the following: an attribute label of an application container, an attribute label of a user to which an application container belongs, or an attribute label of a set to which an application container belongs;

detecting a target attribute label of a target application container in response to a default gateway application request;

using a default gateway pool configured with the detected target attribute label in a gateway resource pool as a target default gateway pool; and allocating a default gateway for the target application container from the target default gateway pool;

wherein the at least one processor is caused to implement detecting the target attribute label of the target application container by:

acquiring a container identification of the target application container from the default gateway application request;

querying whether the target application container is configured with an attribute label according to the container identification; and when it is queried that the target application container is configured with the attribute label, using the attribute label pre-configured for the target application container as the target attribute label; or when it is queried that the target application container is not configured with the attribute label, querying whether the user to which the target application container belongs is configured with the attribute label.

13. The server of claim 11, wherein the at least one processor is caused to further implement:

in a case where no target attribute label is detected or in a case where the target attribute label is detected but no default gateway pool configured with the target attribute label exists in the gateway resource pool, allocating a preset common gateway in the gateway resource pool to the target application container.

14. The server of claim 11, wherein after allocating the default gateway for the target application container from the target default gateway pool, the at least one processor is caused to further implement:

sending the default gateway allocated for the target application container in a form of request response information, a container annotation, or a container label to a container gateway configurator of the target application container.

15. The server of claim 11, wherein the at least one processor is caused to implement allocating the default gateway for the target application container from the target default gateway pool by:

in a case where the target default gateway pool is not configured with an allocation policy, randomly selecting an available gateway from the target default gateway pool to allocate to the target application container; or in a case where the target default gateway pool is configured with the allocation policy, selecting, according to the configured allocation policy, an available gateway from the target default gateway pool to allocate to the target application container.

16. The server of claim 15, wherein the at least one processor is caused to implement selecting, according to the configured allocation policy, the available gateway from the target default gateway pool to allocate to the target application container by one of:

selecting, based on a polling policy, the available gateway from the target default gateway pool to allocate to the target application container;

selecting, from the target default gateway pool, an available gateway with a minimum number of allocated times to allocate to the target application container; or determining, from the target default gateway pool, an available gateway having a maximum available bandwidth, and in a case where an available bandwidth of the available gateway having the maximum available bandwidth is greater than a required bandwidth of the target application container, allocating the available gateway having the maximum available bandwidth to the target application container.

17. The server of claim 11, wherein the at least one processor is caused to implement querying whether a user to which the target application container belongs is configured with the attribute label by: when it is queried that the user to which the target application container belongs is configured with the attribute label, using the attribute label pre-configured for the user as the target attribute label; or when it is queried that the user to which the target application container belongs is not configured with the attribute label, querying whether the set to which the target application container belongs is configured with the attribute label;

wherein the at least one processor is caused to implement querying whether the set to which the target application container belongs is configured with the attribute label by:

when it is queried that the set to which the target application container belongs is configured with the attribute label, using the attribute label pre-configured for the set as the target attribute label; or when it is queried that the set to which the target application container belongs is not configured with the attribute label, detecting that the target attribute label of the target application container does not exist.

18. The server of claim 11, wherein the at least one processor is caused to further implement:

monitoring operating states of a plurality of default gateways in the gateway resource pool;

when an abnormal operating state of a default gateway in the plurality of default gateways exists, denoting the default gateway having the abnormal operating state as unavailable; and after the default gateway denoted as unavailable returns to be normal, denoting the default gateway returning to be normal as available.

19. The server of claim 11, wherein the at least one processor is caused to further implement:

monitoring survivability of an application container associated with an allocated default gateway in the gateway resource pool; and in a case where the associated application container is deleted or operates abnormally, releasing the default gateway that is in the gateway resource pool and referenced by the deleted or abnormal-operating application container.

20. The server of claim 11, wherein the at least one processor is caused to further implement: performing a management operation on the gateway resource pool.

* * * * *